US008131128B2

(12) United States Patent
Otsuka et al.

(10) Patent No.: US 8,131,128 B2
(45) Date of Patent: Mar. 6, 2012

(54) AUDIOVISUAL SYSTEM AND CONTROL METHOD THEREOF

(75) Inventors: Koichi Otsuka, Osaka (JP); Akihiro Mitani, Osaka (JP); Toshiki Murakami, Osaka (JP); Akifumi Sakamoto, Osaka (JP); Masahiko Mizoguchi, Osaka (JP); Akihiro Fujita, Kyoto (JP); Norimichi Kubo, Osaka (JP)

(73) Assignee: Panasonic Corporation, Osaka (JP)

( * ) Notice: Subject to any disclaimer, the term of this patent is extended or adjusted under 35 U.S.C. 154(b) by 926 days.

(21) Appl. No.: 12/158,922

(22) PCT Filed: Dec. 27, 2006

(86) PCT No.: PCT/JP2006/326037
§ 371 (c)(1),
(2), (4) Date: Jun. 23, 2008

(87) PCT Pub. No.: WO2007/077864
PCT Pub. Date: Jul. 12, 2007

(65) Prior Publication Data
US 2009/0232477 A1 Sep. 17, 2009

(30) Foreign Application Priority Data
Dec. 28, 2005 (JP) ................................ 2005-380229

(51) Int. Cl.
*H04N 7/00* (2011.01)
(52) U.S. Cl. .............................. 386/46; 386/95; 386/126
(58) Field of Classification Search ................ 726/9, 26, 726/27, 28, 29; 713/224, 201, 212, 213, 713/220, 223; 709/204, 201, 220, 227; 707/600, 707/607, 608, 609, 687, 821; 380/200, 201, 380/202, 293, 227
See application file for complete search history.

(56) References Cited

U.S. PATENT DOCUMENTS

2001/0020193 A1 9/2001 Teramachi
2002/0194596 A1* 12/2002 Srivastava ....................... 725/37
(Continued)

FOREIGN PATENT DOCUMENTS

EP 1 298 960 4/2003
(Continued)

OTHER PUBLICATIONS

Extended European Search Report dated Apr. 1, 2010.
(Continued)

*Primary Examiner* — Vivek Srivastava
*Assistant Examiner* — Nega Woldemariam
(74) *Attorney, Agent, or Firm* — Dickinson Wright PLLC

(57) ABSTRACT

In an audiovisual system in which a TV, an AV amplifier, a DVD player and the like are combined, another device constituting the system is automatically set to an optimal operation state according to the content recorded on an optical disc. A reproduction content judging unit 406 of a DVD player 400 judges the type (a video signal and an audio signal) and the format of signals included in content that has been read from the optical disc 401. According to the results of judging by the reproduction content judging unit 406, a control unit 403 of the DVD player 400 sends an instruction signal related to the power supply state and an instruction signal related to output of at least one of video and audio to a control unit 105 of a TV 100 and a control unit 203 of an AV amplifier 200.

14 Claims, 4 Drawing Sheets

U.S. PATENT DOCUMENTS

2003/0090590 A1    5/2003  Yoshizawa
2007/0142022 A1*   6/2007  Madonna et al. ............ 455/352

FOREIGN PATENT DOCUMENTS

| | | |
|---|---|---|
| EP | 1 569 088 | 8/2005 |
| JP | 2003-153124 | 5/2003 |
| JP | 2004-200862 | 7/2004 |
| JP | 2005-051547 | 2/2005 |
| JP | 2005-191757 | 7/2005 |

OTHER PUBLICATIONS

S. Edison, "30.2: HDMI: High-Definition Multimedia Interface," XP 007008293, SID international Symposium, vol. XXXIV, May 2003, p. 1024-1027.

"High-Definition Multimedia Interface Specification Version 1.2a," XP003014724, HDMI Licensing, LLC, Dec. 2005, p. i-xiv, p. 1-110, CEC-i-CEC-v, and p. CEC-1-CEC-62.

International Search Report dated May 1, 2007.

* cited by examiner

AUDIOVISUAL SYSTEM AND CONTROL METHOD THEREOF

TECHNICAL FIELD

The present invention relates to an audiovisual system provided with a television receiver that outputs video and audio, an amplifier that outputs audio to an external speaker, and a reproduction apparatus that reproduces content that includes at least one of a video signal and an audio signal from a recording medium on which that content has been recorded, and relates to a method for controlling that system.

BACKGROUND ART

There are audiovisual systems provided with a reproduction apparatus such as a DVD player, a television receiver, and an amplifier. The reproduction apparatus reproduces content that includes a video signal and an audio signal and has been recorded on a recording medium such as an optical disc. The television receiver displays a video signal that has been reproduced with the reproduction apparatus on a display, and outputs an audio signal to a built-in speaker. The amplifier outputs an audio signal to an externally attached speaker.

In the above audiovisual system, when viewing/listening to content recorded on a recording medium, it is necessary for a user to perform a plurality of operations, such as powering on the reproduction apparatus and the television receiver, and switching input of each apparatus to a desired state.

A method for reducing this plurality of operations is proposed in Patent Document 1. FIG. 4 shows the schematic structure of an audiovisual system VAS 2 in which the method of Patent Document 1 is adopted. FIG. 4 shows an example in which the amplifier is omitted in order to make the description easier to understand, and the system is configured with a television receiver (below, abbreviated as TV) 10 and a DVD player 20 that is one type of reproduction apparatus.

The TV 10 includes a tuner 11, a video/audio output unit 12, an input source selection unit 13, and a control unit 14. The tuner 11 receives a broadcast signal. The video/audio output unit 12 performs necessary processing on a video signal and an audio signal and outputs them to a display and a built-in speaker. The input source selection unit 13 switches and outputs an input signal from the tuner 11 and an input signal from the DVD player 20. The control unit 14 controls each of the above units.

The DVD player 20 includes an optical disc control unit 22, a video/audio processing unit 23, and a control unit 24. The optical disc control unit 22 reads content that has been recorded on the optical disc 21. The video/audio processing unit 23 performs necessary processing on the content that has been read with the optical disc control unit 22 and reproduces a video signal and an audio signal. The control unit 24 controls each of the above units.

Next is a simple description of operation of the above conventional audiovisual system VAS 2. When the optical disc 21 is loaded in the DVD player 20, the optical disc control unit 22 reads the content that has been recorded on the optical disc 21. The video/audio processing unit 23 performs necessary processing on the content that has been read and reproduces a video signal and an audio signal, and sends the reproduced video signal and audio signal to the TV 10. On the other hand, the control unit 24 generates a control signal, and sends that control signal to the control unit 14 of the TV 10. This control signal is generated by a method such as setting the electric potential of a signal line connected to the DVD player 20 to a predetermined value.

When the control unit 14 receives the control signal sent from the control unit 24 of the DVD player 20, the TV 10 switches the input of the input source selection unit 13 from the tuner 11 to the DVD player 20. Due to switching of the input of the input source selection unit 13, the video signal and the audio signal that have been output from the audio/video processing unit 23 of the DVD player 20 are input to the video/audio output unit 12.

Due to the TV 10 automatically switching input according to the reproduction state of the DVD player 20 in this manner, it is possible to view/listen to content reproduced with the DVD player 20 without the user switching the input of the TV 10.

Patent Document 1: Japanese Laid-Open Patent Publication No. 2005-51547

DISCLOSURE OF THE INVENTION

Problem to be Solved by the Invention

However, in the above conventional audiovisual system, it is not possible to automatically switch the input when the TV 10 is not powered on, so it is necessary to power on the TV each time the TV is used, or to have the TV always powered on.

Also, regardless of the subject matter of the content recorded on the optical disc 21, when reading of the content from the optical disc 21 is started in the DVD player 20, a control signal is automatically output from the control unit 24. Thus, there is the problem that, as in the case of a music CD, even when a video signal is not included in the content recorded on the optical disc 21 so that it is not appropriate to view/listen with the TV 20, the output of the DVD player 20 is selected by the input source selection unit 13.

Furthermore, although not shown in FIG. 4, when an amplifier that receives an audio signal and outputs the audio signal with a speaker is connected between the DVD player 20 and the TV 10, it is necessary for the user himself/herself to perform all operation of the amplifier.

In this manner, there are aspects of a conventional audiovisual system that should be improved, from the standpoint of operability when viewing/listening to video and audio, and also from the standpoint of outputting video and audio from an appropriate device.

The present invention was made in view of the above conventional problems, and it is an object of the invention to provide an audiovisual system in which by merely reading content from an optical disc, it is possible to automatically set a TV or an amplifier to an optimal operation state, in particular without requiring operation by a user, and to provide a method for controlling that audiovisual system.

Means for Solving the Problem

In order to achieve the above object, the invention provides an audiovisual system provided with a receiver that outputs video and audio, an amplifier that output audio from an external speaker, a reproduction apparatus that reproduces content from a recording medium on which the content is recorded, the content including at least one of a video signal and an audio signal, and a communications line that connects each of the devices, the receiver being provided with at least:
a first reception unit that receives a video signal and an audio signal from outside via the communications line,
a video display unit that displays video based on the video signal received by the first reception unit, a first speaker drive unit that drives a built-in speaker based on the audio signal received by the first reception unit, and a first control unit that controls operation of each of the units;

the amplifier being provided with at least:

a second reception unit that receives a video signal and an audio signal from outside via the communications line, a second speaker drive unit that drives an external speaker based on the audio signal received by the second reception unit, a first transmission unit that transmits at least one of a video signal and an audio signal received by the second reception unit to outside via the communications line, and a second control unit that controls operation of each of the units;

the reproduction apparatus being provided with at least:

a reproduction content judging unit that judges the type and format of signals included in content that has been read from the recording medium, a second transmission unit that transmits at least one of a video signal and an audio signal included in the content that has been read from the recording medium, to outside via the communications line, and a third control unit that controls operation of each of the units;

in which the third control unit, according to the results of judging by the reproduction content judging unit, to the first control unit and the second control unit, sends an instruction signal related to a power supply state and an instruction signal related to output of at least one of video and audio.

In the audiovisual system according to the invention, it is preferable that the instruction signal related to the power supply state is an instruction signal that puts the power supply in an on state or an instruction signal that puts the power supply in a standby state. Also, it is preferable that an instruction signal related to output format is included in the instruction signal related to at least one of video and audio.

Also, in the audiovisual system according to the invention, it is preferable that a cable compliant with High Definition Multimedia Interface (HDMI) specifications is used as the communications line, and the instruction signal is compliant with Consumer Electronics Control (CEC) specifications.

Also, the invention provides a method for controlling an audiovisual system provided with a receiver that outputs video and audio, an amplifier that output audio from an external speaker, and a reproduction apparatus that reproduces content from a recording medium on which the content is recorded, the content including at least one of a video signal and an audio signal, in which the reproduction apparatus judges the type and format of signals included in content that has been reproduced from the recording medium, and according to the results of that judgment, to the receiver and the amplifier, sends an instruction signal related to a power supply state and an instruction signal related to output of at least one of video and audio.

In the method for controlling an audiovisual system according to the invention, it is preferable that the reproduction apparatus, prior to sending an instruction signal related to the power supply state to the receiver, makes an inquiry to the receiver as to the power supply state. Likewise, it is preferable that the reproduction apparatus, prior to sending an instruction signal related to the power supply state to the amplifier, makes an inquiry to the amplifier as to the power supply state.

Also, the invention provides a reproduction apparatus that, along with a receiver that outputs video and audio, and an amplifier that outputs audio from an external speaker, constitutes an audiovisual system, and reproduces content from a recording medium on which content is recorded, the content including at least one of a video signal and an audio signal, the reproduction apparatus being provided with:

a reproduction content judging unit that judges the type and format of signals included in content that has been read from the recording medium, and a transmission unit that transmits at least one of the video signal and the audio signal included in the content that has been read from the recording medium, to outside via the communications line, and a control unit that controls operation of each of the units;

in which the control unit, according to the results of judging by the reproduction content judging unit, to the receiver and the amplifier, sends an instruction signal related to a power supply state and an instruction signal related to output of at least one of video and audio.

Effect of the Invention

With the audiovisual system according to the invention, it is possible to automatically set the power supply state and output format of a receiver and an amplifier according to the type (video signal and audio signal) and format of signals included in content recorded on a recording medium. As a result, merely by a user loading a recording medium in a reproduction apparatus and starting of content, and without performing another operation, it is possible to enjoy video and audio in an optimal state.

BEST MODE FOR CARRYING OUT THE INVENTION

Figure 1:
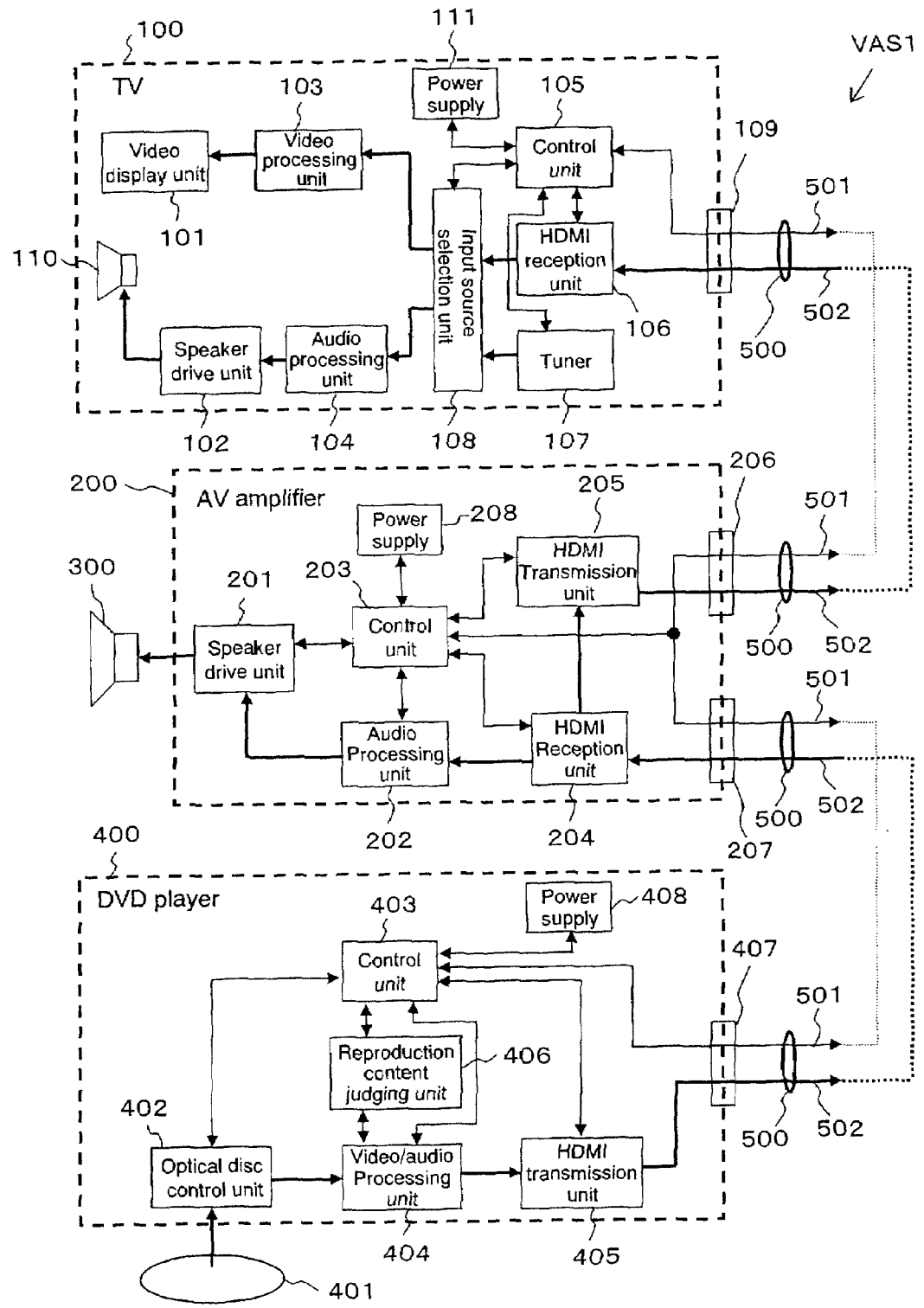
FIG. 1 shows the configuration of an audiovisual system according to an embodiment of the invention.

FIG. 1 shows the configuration of an audiovisual system according to an embodiment of the invention. An audiovisual system VAS 1 according to this embodiment is configured with a TV 100, an AV amplifier 200 to which an external speaker 300 is attached, and a DVD player 400. The TV 100 is an example of a receiver in the invention, the AV amplifier 200 is one type of amplifier, and the DVD player 400 is an example of a reproduction apparatus.

The AV amplifier 200 and the DVD player 400 are connected with a cable (referred to below as an HDMI cable) 500 compliant with High Definition Multimedia Interface (HDMI) specifications. A video signal and an audio signal that have been reproduced by the DVD player 400 are input to the AV amplifier 200. The TV 100 and the AV amplifier 200 are also connected with an HDMI cable, and a video signal and an audio signal that have been output from the AV amplifier 200 are input to the TV 100. Also, the TV 100, the AV amplifier 200 and the DVD player 400 are capable of sending and receiving to/from each other, via the HDMI cables 500, commands compliant with Consumer Electronics Control (CEC), which is an HDMI optional specification, via an HDMI cable.

An HDMI cable 500 is divided into a CEC line 501 on which commands are transmitted and a video/audio line on which video signals and audio signals are transmitted. Respective control units 105, 203, and 403 of the TV 100, the AV amplifier 200 and the DVD player 400 are capable of sending and receiving commands to/from each other via the CEC line 501. On the other hand, sending and receiving of video signals and audio signals is performed via the video/audio line 502, and an HDMI reception unit and an HDMI transmission unit that are disposed within each device. In consideration of copyright protection, sending and receiving of signals via the HDMI reception unit and the HDMI transmission unit is performed in order that descrambled video signals or audio signals are not present on the HDMI cables.

The TV 100 includes a video display unit 101, a speaker drive unit 102, a video processing unit 103, an audio processing unit 104, a control unit 105 configured with a microcomputer, an HDMI reception unit 106, a tuner 107, an input source selection unit 108, a connector 109, a built-in speaker 110, and a power supply 111. As another constituent element, there is a remote control reception unit, but this is not directly related to the invention and thus is omitted from this description.

When the control unit 105 receives a command via the HDMI cable 500, the control unit 105 controls each unit according to the content of the received command. For example, the input source selection unit 108 switches input to any of the tuner 107 that receives a TV signal and the HDMI reception unit 106, according to an instruction of the control unit 105. Note that the control unit 105 is actually connected by control wiring to the video display unit 101, the video processing unit 103, the speaker drive unit 102, and the audio processing unit 104, but the wiring is omitted from the drawings in order to avoid confusion. The HDMI reception unit 106, according to an instruction of the control unit 105, uses an encryption key to descramble video signals and audio signals that have been input from the connector 109. Via the input source selection unit 108, descrambled video signals are transmitted to the video processing unit 103 and descrambled audio signals are transmitted to the audio processing unit 104.

The video processing unit 103 performs necessary processing on a video signal that has been output from the HDMI reception unit 106. The video display unit 101 displays a video signal that has been output from the video processing unit 103 on a display. Likewise, the audio processing unit 104 performs necessary processing on an audio signal that has been descrambled by the HDMI reception unit 106, after decoding the audio signal if the audio signal is compressed, and performs necessary processing on the audio signal that has been descrambled by the HDMI reception unit 106 if the audio signal is not compressed. The speaker drive unit 102 amplifies an output signal of the audio processing unit 104, and outputs audio from the built-in speaker 110.

The power supply 111 supplies power to each unit of the TV 100. Within the TV 100, the method for supplying power is different for the control unit 105 than for the other portions. In a state in which the power supply 111 has been connected to a commercial power supply, power is always supplied from the power supply 111 to the control unit 105. This is because even in a state in which video or audio cannot be output, the control unit 105 sends commands to outside or receives commands from outside via the CEC line 501.

On the other hand, supply of power to the video processing unit 103, the audio processing unit 104, and the like is performed in a case where video or audio is output due to control by the control unit 105. Hereinafter, a state in which power is supplied only to the control unit 105 is referred to as a power supply "standby state", and a state in which power is supplied to all portions that require power is referred to as a power supply "on state".

The AV amplifier 200 includes a speaker drive unit 201, an audio processing unit 202, a control unit 203 configured with a microcomputer, an HDMI reception unit 204, an HDMI transmission unit 205, connectors 206 and 207, and a power supply 208. A reproduction apparatus other than the DVD player 400 can also be connected to the AV amplifier 200. In this case, it is possible to switch input by adding a connector, and same as in the case of the TV 100, by providing an input source selection unit in the AV amplifier 200.

The control unit 203 controls each unit according to the content of commands received via the connectors 206 and 207. For example, the control unit 203 transmits an audio signal received by the HDMI reception unit 204 to the audio processing unit 202, and again outputs the signal received by the HDMI reception unit 204 from the HDMI transmission unit to the HDMI cable 500.

In a case where an audio signal received by the HDMI reception unit 204 is compressed, the audio processing unit 202 decodes and then performs necessary processing on the audio signal, and in a case where the audio signal is not compressed, the audio processing unit 202 performs necessary processing on the audio signal. The speaker drive unit 201 amplifies the audio signal output from the audio processing unit 202, and then outputs the amplified audio signal as audio from the external speaker 300. Here, the speaker drive unit 201, the audio processing unit 202, and the external speaker 300 constitute a multi-channel speaker, so as to be compatible with a two-channel audio signal or a 5.1 channel audio signal that is input. Also, the AV amplifier 200 is capable of two-channel or 5.1 channel output to the external speaker 300, according to the format of the received or input audio signal.

The HDMI reception unit 204 uses an encryption key to descramble video signals and audio signals that have been sent from another device via the video/audio line 502 of the HDMI cable 500. On the other hand, the HDMI transmission unit 205 uses an encryption key to again scramble the video signals and audio signals that have been descrambled by the HDMI reception unit 204, and then sends the scrambled signals to the video/audio line 502 of the HDMI cable 500.

The power supply 208 supplies power to each unit of the AV amplifier 200. Same as in the case of the TV 100, the method for supplying power to each portion of the AV amplifier 200 differs. In a state in which the power supply 208 has been connected to a commercial power supply, power is always supplied from the power supply 208 to the control unit 203, the HDMI reception unit 204, and the HDMI transmission unit 205. On the other hand, power is supplied to the speaker drive unit 201 and the audio processing unit 202 by the control unit 203 only in a case where it is necessary.

Same as in the case of the TV 100, power is always supplied to the control unit 203 in order to send or receive commands. Below is a description of the reasons that power is always supplied to the HDMI reception unit 204 and the HDMI transmission unit 205. In a case where audio is not output from the external speaker 300, basically, it is not necessary to supply power to the AV amplifier 200. However, there may be cases where video signals and audio signals are transmitted to the TV 100 from the DVD player 400 via the video/audio line 502 of the HDMI cable 500. Thus, power is always supplied to the HDMI reception unit 204 and the HDMI transmission unit 205, so that an operating state is maintained.

Same as in the case of the TV 100, a state in which power is supplied only to the control unit 203, the HDMI reception unit 204, and the HDMI transmission unit 205 is referred to as a power supply "standby state", and a state in which power is supplied to all portions that require power is referred to as a power supply "on state".

The DVD player 400 includes an optical disc control unit 402, a control unit 403 configured with a microcomputer, a video/audio processing unit 404, an HDMI transmission unit 405, a reproduction content judging unit 406, a connector 407, and a power supply 408.

The optical disc control unit 402 reads a video signal and an audio signal from the optical disc 401, on which the video signal and the audio signal, which are content, have been recorded in a compressed state. The video/audio signal processing unit 404 performs decoding processing, and then further performs necessary processing, on the video signal that has been read by the optical disc control unit 402. Also, the video/audio processing unit 404 performs necessary processing on the audio signal that has been read by the optical disc control unit 402. The video signal and the audio signal on which necessary processing has been performed by the video/audio processing unit 404 are input to the HDMI transmission unit 405.

The HDMI transmission unit 405 uses an encryption key to scramble the video signal and the audio signal, and then sends the scrambled signals to the video/audio line 502 of the HDMI cable 500.

The reproduction content judging unit 406, based on the signals processed by the video/audio processing unit 404, judges the type (video signal and audio signal) and format of the signals included in the content that has been read from the optical disc 401.

Next is a description of the method for judging by the reproduction content judging unit 406. CDs and DVDs are representative examples of optical discs. Among CDs, there are audio CDs (also referred to as CDDA) and Video-CDs, and also CDs on which an audio signal has been recorded in MP3 or WMA format. Which among these CDs the optical disc 401 corresponds to can be judged from TOC information or file system management information.

Next, in a case where the optical disc is a DVD, the format in which a video signal or an audio signal is recorded may be DVD-Video, DVD-Audio, DVD-Video Recording (VR), or JPEG, or furthermore may be MPEG/Dvix, which is one type of data compression specification for moving images. Included in the management information, called DVD lead-in, is media physical information. Further, in video manager information, called VMGI, information related to an audio stream and a video stream is written.

The reproduction content judging unit 406 extracts each of the pieces of information described above from the content read from the optical disc 401, judges whether any of a video signal and an audio signal is included in the content, and furthermore judges the format of those signals.

The control unit 403, based on the results of judging by the reproduction content judging unit 406, judges whether any of the TV 100 and the AV amplifier 200 is necessary when reproducing the content, and instructs the respective control units 105 and 203 of the TV 100 and the AV amplifier 200.

The power supply 408 supplies power to each unit of the DVD player 400. Same as in the TV 100 and the AV amplifier 200, in the power supply standby state, power is supplied only to the control unit 403, and in the power supply on state, power is supplied from the power supply 408 to all units that require power, such as the video/audio processing unit 404.

Figure 2:
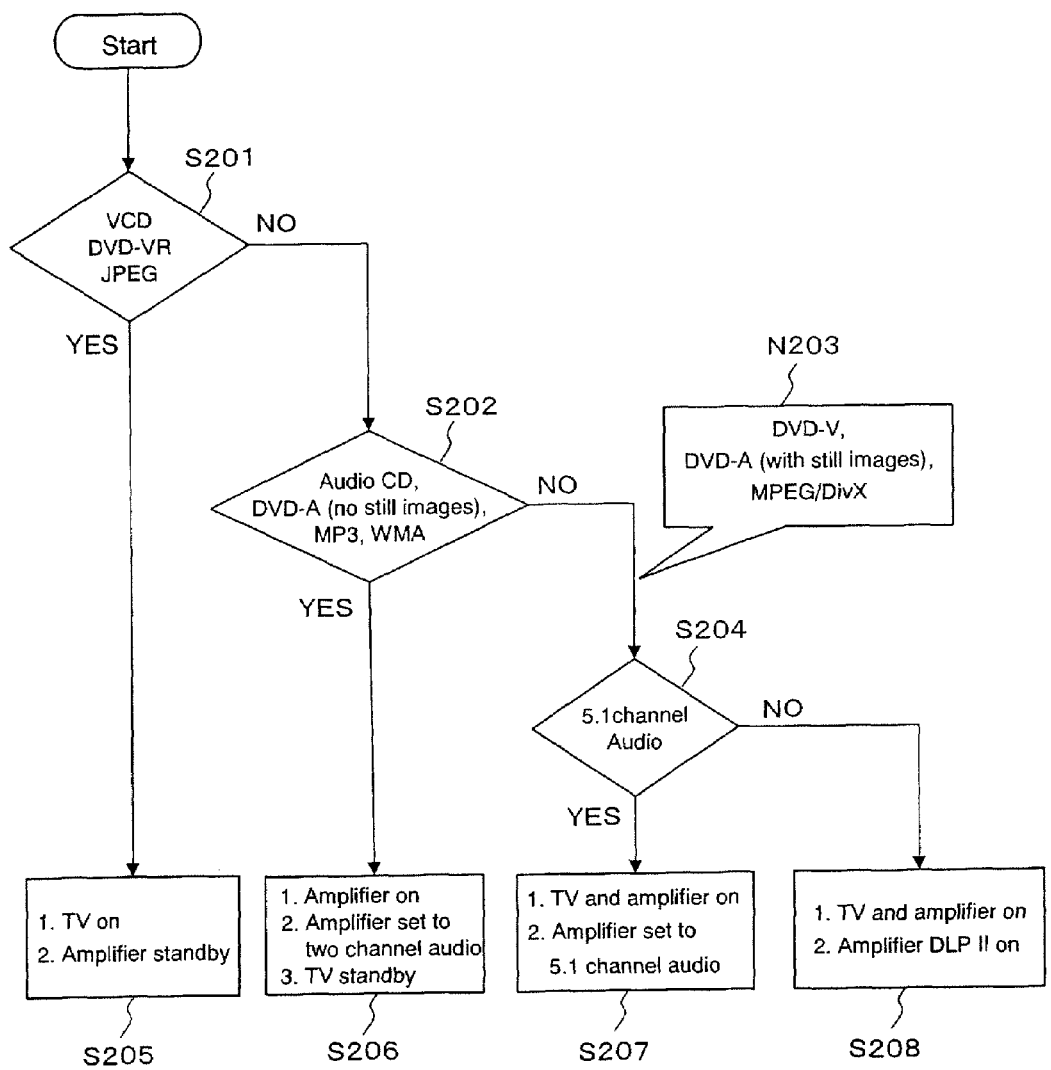
FIG. 2 is a flowchart that illustrates a judging operation of a reproduction content judging unit of a DVD player that constitutes the audiovisual system of this embodiment of the invention.

Next, with reference to the flowchart in FIG. 2, is a description of the process of judging performed by the reproduction content judging unit 406, and the contents of instruction by the control unit 403 of the DVD player to the control unit 105 of the TV 100 and the control unit 205 of the AV amplifier 205 based on the results of that judging.

The DVD player 400 is capable of reproducing video signals and audio signals from a plurality of types of optical discs on which video signals and audio signals of different formats are recorded. Steps S201 to S204 in FIG. 2 show the contents of judging performed by the reproduction content judging unit 406. The control unit 403, based on the results of judging by the reproduction content judging unit 406, gives an instruction including the output format of video signals and audio signals as shown at the bottom of FIG. 2 (Steps S205 to S208).

The reproduction content judging unit 406, in Step S201, judges whether the optical disc 401 loaded in the DVD player 400 is a Video-CD, a disc recorded in DVD-Video Recording (VR) format, or a disc on which still images in JPEG format have been recorded. In the case of YES in Step S201, the control unit 403, as shown in Step S205, instructs the control unit 105 of the TV 100 to put the power supply in the on state, and instructs the control unit 203 of the AV amplifier 200 to put the power supply in the standby state. In the case of NO in Step S201, the procedure proceeds to the next step, Step S202.

The reproduction content judging unit 406, in Step S202, judges whether the optical disc 401 is an audio CD, a disc in a DVD-audio format that does not include still images, or whether the disc is recorded in MP3 or WMA format, which are audio data compression specifications. In the case of YES in Step S202, the control unit 403, as shown in Step S206, instructs the control unit 203 of the AV amplifier 200 to put the power supply in the on state, and to set the number of audio channels to two channels. Further, the control unit 403 instructs the control unit 105 of the TV 100 to put the power supply in the standby state.

In the case of NO in Step S202, as shown in Note N203, the optical disc 401 is any of a disc recorded in DVD-Video format, a disc among DVD-Audio formats that includes still images, or a disc recorded in MPEG/Dvix format, which is one type of data compression specification for moving images. The reproduction content judging unit 406, in Step S204, judges whether the number of audio channels is 5.1 channels. In the case of YES in Step S204, the control unit 403, as shown in Step 207, instructs the control unit 105 of the TV 100 and the control unit 203 of the AV amplifier 200 to put the power supply in the on state. Furthermore, the control unit 403 instructs the control unit 203 of the AV amplifier to set the number of audio channels to 5.1 channels.

In the case where the reproduction content judging unit 406 has judged NO in Step S204, i.e., that the number of audio channels is not 5.1 channels, the control unit 403, as shown in Step S208, instructs the control unit 105 of the TV 100 and the control unit 203 of the AV amplifier 200 to put the power supply in the on state. Furthermore, the control unit 403 instructs the control unit 203 of the AV amplifier 200 to turn on DPL II.

Figure 3:
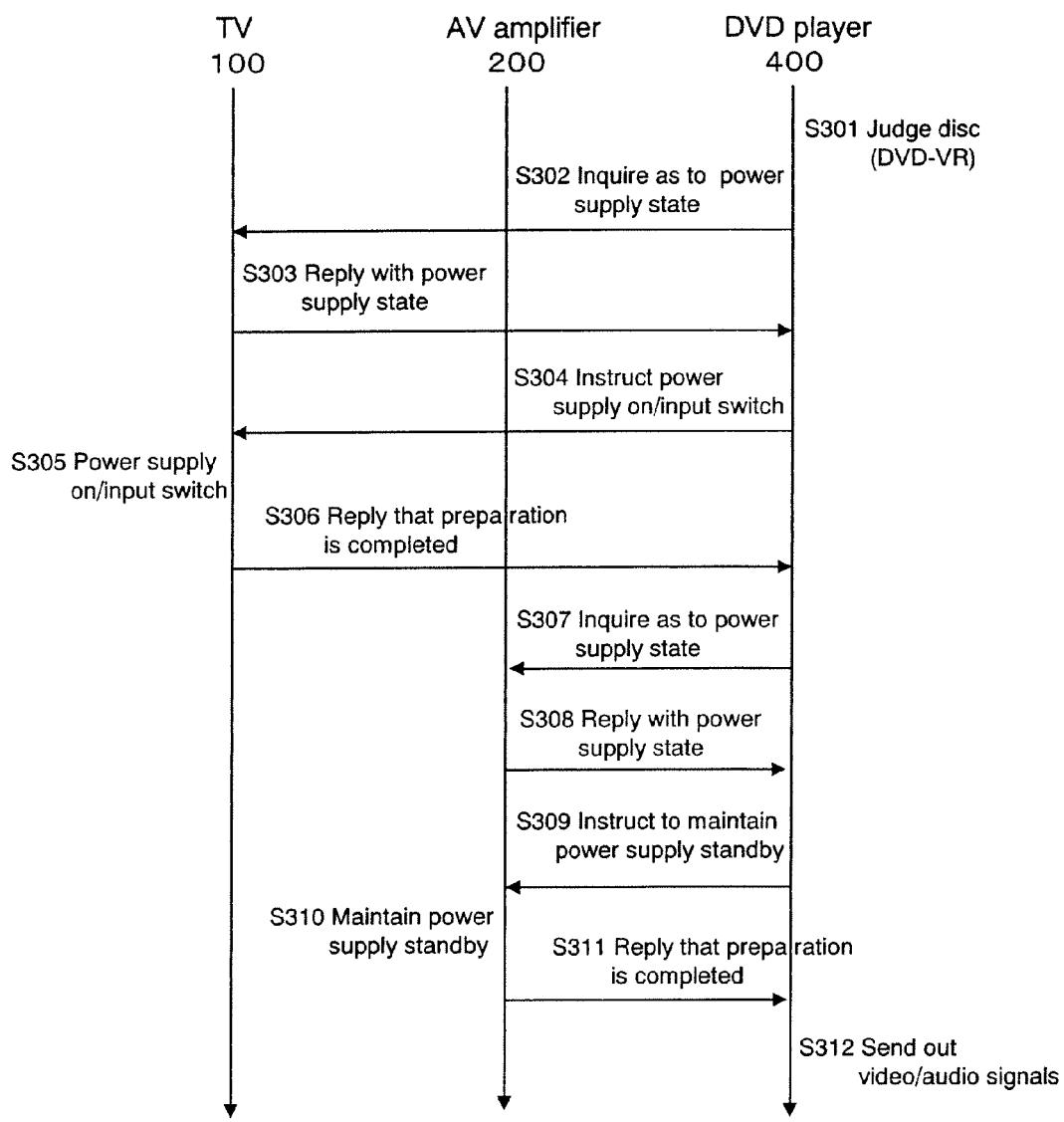
FIG. 3 shows an example of a control sequence in the configuration of the system in FIG. 1.
Figure 4:
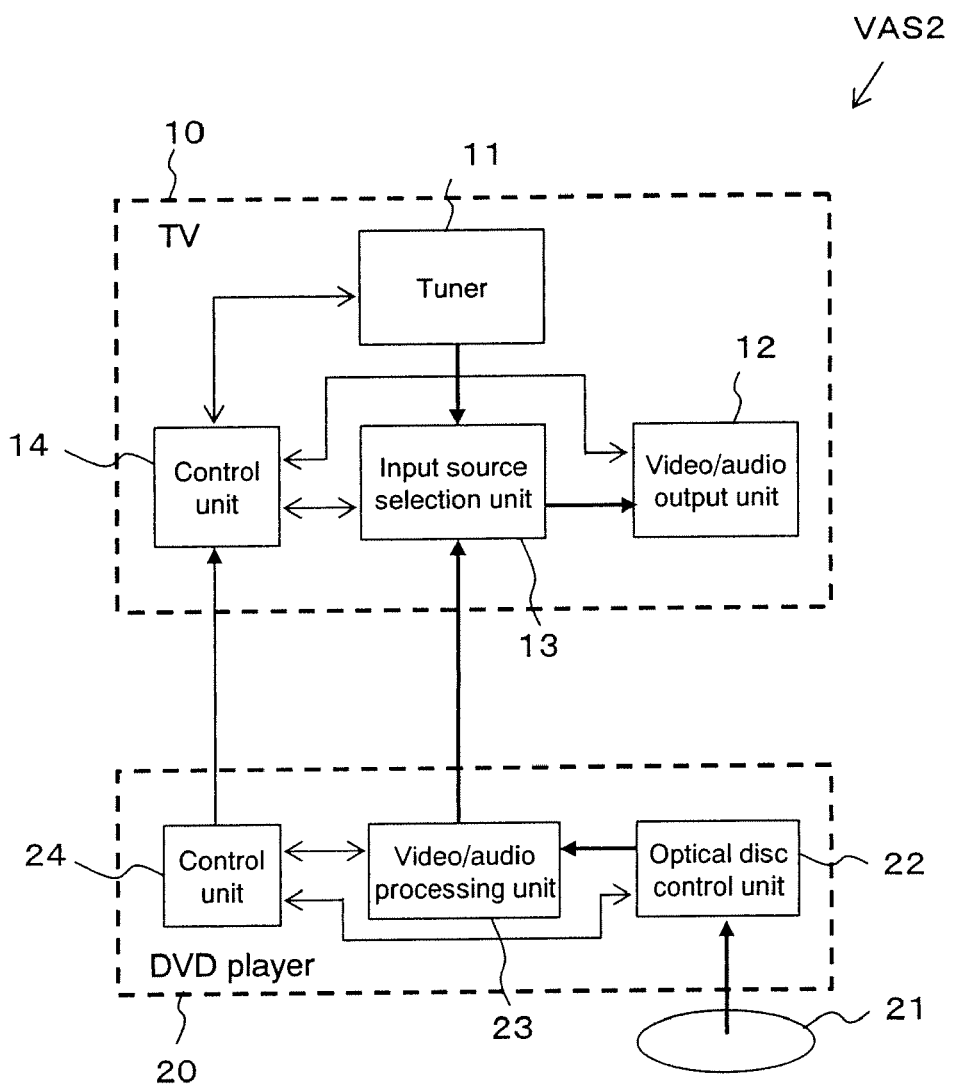
FIG. 4 shows the configuration of a conventional audiovisual system.

Next, the operation of the audiovisual system according to the present embodiment based on the flowchart in FIG. 2 will be described with reference to FIG. 3. FIG. 3 shows, as one example, the control sequence between the DVD player 400 and the TV 100 and AV amplifier 200 when a judgment of YES has been made in Step S201 in FIG. 2. It is assumed that the content of a TV broadcast is recorded in DVD-VR format on an optical disc that has been loaded in the DVD player 400.

Also, in the example shown in FIG. 3, it is assumed that at first, the power supplies for the TV 100 and the AV amplifier 200 are each in the standby state. Further, instructions, inquiries, and replies thereto between the control units are performed with commands transmitted through the CEC lines 501.

The user turns on the power supply of the DVD player 400, and then loads the optical disc 401 in the DVD player 400. Afterward, content is read from the optical disc 401. In Step S301, the reproduction content judging unit 406, from management information or the like included in the content that has been read with the optical disc control unit 402 and reproduced with the video/audio processing unit 404, judges that the content of a TV broadcast is recorded in DVD-VR format on the optical disc 401.

In Step S302, the control unit 403 of the DVD player 400 receives the results of judging by the reproduction content judging unit 406, and inquires to the control unit 105 of the TV 100 via the CEC line 501 as to whether the power supply is in the on state or in the standby state.

In Step S303, the control unit 105 of the TV 100 sends a reply to the control unit 403 of the DVD player 400 that the power supply is in the standby state.

In Step S304, the control unit 403 of the DVD 400 instructs the TV 100 to put the power supply in the on state, and instructs the TV 100 to switch input of the input source selection unit 108 to the HDMI reception unit 106 side.

In Step S305, based on the instruction of the control unit 403 of the DVD player 400, the control unit 105 of the TV 100 puts the power supply in the on state, and switches the input of the input source selection unit 108 to the HDMI reception unit 106 side. Afterward, in Step S306, the control unit 105 sends a reply to the control unit 403 of the DVD player 400 that preparation to output video and audio is completed.

Next, in Step S307, the control unit 403 of the DVD player 400 inquires to the control unit 203 of the AV amplifier 200 as to whether the power supply is in the on state or in the standby state.

In Step S308, the control unit 203 of the AV amplifier 200 sends a reply to the control unit of the control unit 403 of the DVD player that the power supply is in the standby state.

In Step S309, the control unit 403 of the DVD 400 instructs the TV 100 to continuously keep the power supply in the standby state.

In Step S310, the control unit 203 of the AV amplifier keeps the power supply in the standby state, and furthermore, in Step S311 sends a reply to the control unit 403 of the DVD player 400 that preparation is completed.

The control unit 403 of the DVD player, from the reply from the TV 100 in Step S306 and the reply from the AV amplifier 200 in Step S311, confirms that preparation of the TV 100 and the AV amplifier 200 is completed. Afterward the control unit 403 instructs the optical disc control unit 402 to read content from the optical disc 401. The video signals and audio signals that have been reproduced with the video/audio processing unit 404 are sent out from the HDMI transmission unit 405 (Step S312).

The video signals and audio signals that have been sent out from the HDMI transmission unit 405 are transmitted to the HDMI reception unit 204 of the AV amplifier 200 via the video/audio line 502 of the HDMI cable 500. The video signals and audio signals are temporarily descrambled by the HDMI reception unit 204, then rescrambled by the HDMI transmission unit 205, and transmitted to the HDMI reception unit 106 of the TV 100 via the video/audio line 502.

The video signals and audio signals received by the HDMI reception unit 106 are here descrambled, again separated into video signals and audio signals, and then input to the input source selection unit 108. Due to the instruction of the control unit 105, the input of the input source selection unit 108 has been switched to the HDMI reception unit 106 side. Thus, the video signal that has been output from the HDMI reception unit 106 is input to the video processing unit 103, and here, after necessary processing has been performed, the video signal is displayed as video on the display of the video display unit 100.

On the other hand, the audio signal that has been output from the HDMI reception unit 106 is input to the audio processing unit 104. In a case where the audio signal is compressed, necessary processing is performed after decoding with the audio processing unit 104, and in a case where the audio signal is not compressed, necessary processing is performed with the audio processing unit 104. The audio signal output from the audio processing unit 104 is amplified by the speaker drive unit 102, and output as audio from the built-in speaker 110.

Above, the operation sequence was described for a case when video/audio signals in DVD-VR format recorded on the optical disc 401 are output by the TV 100, but control is performed with the same sequence also in a case when an optical disc that includes video signals or audio signals in another format has been loaded.

For example, in a case when video signals and audio signals in DVD-Video format are recorded on the optical disc, the sequence proceeds from Step S202 to S204 in FIG. 2, and the control unit 403 instructs the control unit 105 and the control unit 203 to put the power supply of both the TV 100 and the AV amplifier 200 in the on state. Further, in a case where the number of audio channels is 5.1 channels (YES in Step S204 in FIG. 2), the control unit 403 instructs the control unit 203 to set the output format of the AV amplifier 200 to 5.1 channels. As a result, audio is output in 5.1 channel format from the external speaker 300 of the AV amplifier 200, and video is displayed in the video display unit 101 of the TV 100.

At this time, the control unit 105, based on an instruction from the control unit 403, mutes output of the speaker drive unit 102 of the TV 100, thus stopping output of audio from the built-in speaker 110.

Note that in a case where the reproduction content judging unit 406 has judged that content including a video signal is not present on the optical disc 401, it is not necessary to turn on the power supply of the TV 100. However, even in such a case, it may be desired to display the subject matter of the content or the state of the DVD player 400 on the TV 100 using a GUI. In this case, a GUI generated by a GUI display unit, not shown in the drawings, within the DVD player 400 is displayed on the display of the video display unit 101. Thus, the control unit 403 of the DVD player 400 instructs the control unit 105 of the TV 100 to put the power supply of the TV 100 in the on state, and to switch the input of the input source selection unit 108 to the HDMI reception unit 106 side.

Also note that in a case where the DVD player 400 has finished reading content, or in a case where the user has stopped reproduction of content, it is no longer necessary for the input source selection unit 108 of the TV 100 to select input from the HDMI reception unit 106. At this time, the control unit 403 of the DVD player 400 may emit a command that instructs the input source selection unit 108 of the TV 100 to select input from the tuner 107 such that a TV broadcast can be received.

Also, in the case described above, it is not necessary to put the power supply of the AV amplifier 200 in the on state. However, in a case where it is desired to also put the power supply of the AV amplifier 200 in the on state, same as in the case described in Steps S307 to S311 in FIG. 3, the control unit 403 of the DVD player 400 inquires to the control unit 203 of the AV amplifier 200 as to the power supply state, and in a case where the power supply is in the standby state, instructs that the power supply be put in the on state.

As described above, in the audiovisual system according this embodiment, by merely loading the optical disc 401 in the DVD player 400 and starting to read content, it is possible to automatically set other devices constituting the system to an optimal state, and enjoy video and audio.

Also, in the above-described embodiment, a case was described in which a DVD player is used as a reproduction apparatus, but the invention is not limited to this. Of course, the same effects as in the case of using a DVD player are obtained also when using another reproduction apparatus in which an optical disc serves as a recording medium, such as a DVD recorder, or a reproduction apparatus in which a memory card serves as a recording medium.

INDUSTRIAL APPLICABILITY

With the audiovisual system according to the invention, by merely reproducing content recorded on a recording medium, it is possible to automatically set the power supply and the output format of a receiver and an amplifier to optimal state, without requiring operation by a user. Thus, the invention is useful when used in an audiovisual system in which various devices are connected.

The invention claimed is:

1. An audiovisual system comprising a receiver that outputs video and audio, an amplifier that outputs audio from an external speaker, a reproduction apparatus that reproduces content from a recording medium on which the content is recorded, the content including at least one of a video signal and an audio signal, and a communications line that connects each of the receiver, the amplifier, and the reproduction apparatus, the receiver being provided with at least:
  a first reception unit that receives a video signal and an audio signal from outside via the communications line,
  a video display unit that displays video based on the video signal received by the first reception unit,
  a first speaker drive unit that drives a built-in speaker based on the audio signal received by the first reception unit,
  a first control unit that controls operations of each of the units of the receiver, and
  a first power supply unit configured to supply power either in a first standby state in which power is supplied to the first control unit but not to the video display unit or the first speaker drive unit of the receiver, or in a first on state in which power is supplied to the first control unit, the video display unit and the first speaker drive unit of the receiver, according to an instruction of the first control unit;
the amplifier being provided with at least:
  a second reception unit that receives at least one of a video signal and an audio signal from the outside via the communications line,
  a second speaker drive unit that drives the external speaker based on the audio signal received by the second reception unit,
  a first transmission unit that transmits at least one of the video signal and the audio signal received by the second reception unit to the outside via the communications line,
  a second control unit that controls operations of each of the units of the amplifier, and
  a second power supply unit configured to supply power either in a second standby state in which power is supplied to the second control unit but not to the second speaker drive unit of the amplifier, or in a second on state in which power is supplied to the second control unit and the second speaker drive unit of the amplifier, according to an instruction of the second control unit; and
the reproduction apparatus being provided with at least:
  a reproduction content judging unit that judges a type and a format of signals included in the content that has been read from the recording medium,
  a second transmission unit that transmits at least one of a video signal and an audio signal included in the content that has been read from the recording medium to the outside via the communications line, and
  a third control unit that controls operations of each of the units of the reproduction apparatus;
wherein, according to results of the judging by the reproduction content judging unit, the third control unit sends, to the first control unit and the second control unit, an instruction signal related to a power supply state instructing which power supply state from among the first standby state and the first on state the first power supply unit is to be put into to supply power and which power supply state from among the second standby state and the second on state the second power supply unit is to be put into to supply power, an instruction signal instructing whether or not video is to be output from the receiver, and an instruction signal related to output of audio.

2. The audiovisual system according to claim 1, wherein an instruction signal related to an output format is included in the instruction signal related to output of audio.

3. The audiovisual system according to claim 1, wherein cables compliant with High Definition Multimedia Interface (HDMI) specifications are used as the communications line, and the instruction signals are compliant with Consumer Electronics Control (CEC) specifications.

4. The audiovisual system according to claim 1, wherein the recording medium is an optical disc.

5. A method to control an audiovisual system comprising a receiver that outputs video and audio, an amplifier that outputs audio from an external speaker, and a reproduction apparatus that reproduces content from a recording medium on which the content is recorded, the content including at least one of a video signal and an audio signal, the receiver being provided with at least:
  a first reception unit that receives a video signal and an audio signal from outside via a communications line,
  a video display unit that displays video based on the video signal received by the first reception unit,
  a first speaker drive unit that drives a built-in speaker based on the audio signal received by the first reception unit, and
  a first control unit that controls operations of each of the units of the receiver; and
the amplifier being provided with at least:
  a second reception unit that receives at least one of a video signal and an audio signal from the outside via the communications line,
  a second speaker drive unit that drives the external speaker based on the audio signal received by the second reception unit, a first transmission unit that transmits at least one of the video signal and the audio signal received by the second reception unit to the outside via the communications line, and a second control unit that controls operations of each of the units of the amplifier;

wherein the reproduction apparatus judges a type and a format of signals included in the content that has been reproduced from the recording medium, and according to results of the judging, sends, to the receiver and the amplifier, an instruction signal related to a power supply state instructing which power supply state from among a first standby state and a first on state a first power supply unit of the receiver is to be put into to supply power to the receiver and which power supply state from among a second standby state and a second on state a second power supply unit of the amplifier is to be put into to supply power to the amplifier, an instruction signal instructing whether or not video is to be output from the receiver, and an instruction signal related to output of audio, the first standby state being a state in which power is supplied to the first control unit but not to the video display unit or the first speaker drive unit of the receiver, the first on state being a state in which power is supplied to the first control unit, the video display unit and the first speaker drive unit of the receiver, the second standby state being a state in which power is supplied to the second control unit but not to the second speaker drive unit of the amplifier, and the second on state being a state in which power is supplied to the second control unit and the second speaker drive unit of the amplifier.

6. The method to control an audiovisual system according to claim 5, wherein an instruction signal related to an output format is included in the instruction signal related to output of audio.

7. The method to control an audiovisual system according to claim 5, wherein the reproduction apparatus, prior to sending the instruction signal related to the power supply state to the receiver, makes an inquiry to the receiver as to the power supply state.

8. The method to control an audiovisual system according to claim 5, wherein the reproduction apparatus, prior to sending the instruction signal related to the power supply state to the amplifier, makes an inquiry to the amplifier as to the power supply state.

9. The method to control an audiovisual system according to claim 5, wherein the recording medium is an optical disc.

10. A reproduction apparatus configured to be connectable to a receiver that outputs video and audio, and an amplifier that outputs audio from an external speaker, and to reproduce content from a recording medium on which the content is recorded, the content including at least one of a video signal and an audio signal, the receiver being provided with at least:
a first reception unit that receives a video signal and an audio signal from outside via a communications line,
a video display unit that displays video based on the video signal received by the first reception unit,
a first speaker drive unit that drives a built-in speaker based on the audio signal received by the first reception unit, and
a first control unit that controls operations of each of the units of the receiver;

the amplifier being provided with at least:
a second reception unit that receives at least one of a video signal and an audio signal from the outside via the communications line,
a second speaker drive unit that drives the external speaker based on the audio signal received by the second reception unit,
a first transmission unit that transmits at least one of the video signal and the audio signal received by the second reception unit to the outside via the communications line, and
a second control unit that controls operations of each of the units of the amplifier; and the reproduction apparatus comprising:
a reproduction content judging unit that judges a type and a format of signals included in the content that has been read from the recording medium,
a transmission unit that transmits at least one of the video signal and the audio signal included in the content that has been read from the recording medium, to the outside via the communications line, and
a control unit that controls operations of each of the units of the reproduction apparatus;

wherein the control unit, according to results of the judging by the reproduction content judging unit, sends, to the receiver and the amplifier, an instruction signal related to a power supply state instructing in which power supply state from among a first standby state and a first on state a first power supply unit of the receiver is to be put into to supply power to the receiver and in which power supply state from among a second standby state and a second on state a second power supply unit of the amplifier is to be put into to supply power to the amplifier, an instruction signal instructing whether or not video is to be output from the receiver, and an instruction signal related to output of audio, the first standby state being a state in which power is supplied to the first control unit but not to the video display unit or the first speaker drive unit of the receiver, the first on state being a state in which power is supplied to the first control unit, the video display unit and the first speaker drive unit of the receiver, the second standby state being a state in which power is supplied to the second control unit but not to the second speaker drive unit of the amplifier, and the second on state being a state in which power is supplied to the second control unit and the second speaker drive unit of the amplifier.

11. The reproduction apparatus according to claim 10, wherein an instruction signal related to an output format is included in the instruction signal related to output of audio.

12. The reproduction apparatus according to claim 10, wherein a cable compliant with High Definition Multimedia Interface (HDMI) specifications is used as the communications line, and the instruction signals are compliant with Consumer Electronics Control (CEC) specifications.

13. The reproduction apparatus according to claim 10, wherein in a case where a video signal is not included in the content, the control unit is configured to send an instruction signal that displays a GUI in the video display unit of the receiver.

14. The reproduction apparatus according to claim 10, wherein the recording medium is an optical disc.

* * * * *